United States Patent [19]

Liber

[11] 4,343,065
[45] Aug. 10, 1982

[54] LOCK AND HINGE ROTARY DEVICE

[75] Inventor: Michel Liber, Paris, France

[73] Assignee: Seilib, France

[21] Appl. No.: 129,808

[22] Filed: Mar. 12, 1980

[30] Foreign Application Priority Data

Sep. 5, 1978 [FR] France ............................. 78 25485

[51] Int. Cl.³ .......................... E05D 7/12; E05D 9/00
[52] U.S. Cl. ....................................... 16/225; 16/382
[58] Field of Search ..... 16/149, 150, 225 (U.S. only), 16/382 (U.S. only); 292/190

[56] References Cited

U.S. PATENT DOCUMENTS 3,813,118  5/1974  Liber .............................. 292/190 X

FOREIGN PATENT DOCUMENTS 712946  9/1966  Italy ..................................... 16/149
1022636  3/1966  United Kingdom ................. 16/150
1180411  2/1970  United Kingdom ................. 16/150

Primary Examiner—Wm. Carter Reynolds
Attorney, Agent, or Firm—A. Fred Starobin; Karl W. Flocks

[57] ABSTRACT

A rotary device acting as a lock between two parts and affording a supplementary function of hinging the two parts after the parts have been primarily locked. Each of the two semi-circular bolts which are not attached to one another becomes a flap carrying a hinge portion disposed in such a way that the hinge portions of the flaps are aligned with one another when the diameters of the flaps are placed side by side.

2 Claims, 9 Drawing Figures

LOCK AND HINGE ROTARY DEVICE

BACKGROUND OF THE INVENTION

This invention relates to a rotary device acting as a lock between two parts and affording a supplementary function, namely hinging said two parts, with the locking of said parts being effected preliminarily.

A rotary lock device has been described in the U.S. Pat. No. 3,813,118. Said lock comprises two semi-circular bolts which are placed side by side along their diameter when the parts to be locked are in contact with one another and which in this position of the parts constantly complement one another when they are driven into rotation.

Each semi-circular bolt carries two semi-circular beads, one of which lies on the edge of the semi-circle while the other is placed on the side so that said bolt is maintained captive with one degree of liberty within a correspondingly shaped housing formed in one of the parts to be locked and following the rotation imparted thereto comes into engagement with a symmetrical housing formed in the other part to be locked.

Each semi-circular housing is formed with a groove to receive a bolt bead placed on the edge and a groove to receive a bolt bead placed on the side.

According to this invention, each bolt becomes a flap carrying a hinge portion disposed in such a way that the hinge portions of the flaps are aligned with one another when the diameters of the flaps are placed side by side.

When the flap diameters are aligned with the edge face T of parts A and B, the latter are neither locked nor hinged, but as soon as the flaps are rotated in one direction or the other, the parts become locked, said parts being effectively hinged only when the aligned hinge portions are moreover aligned with the edge face of parts A and B.

The device according to the invention can be used each time it is necessary to put two parts into a hinged relationship. It can be employed, for instance, to provide hinges for chests, suitcases, boxes, doors, and the like.

Other characteristics and advantages of this invention will appear from the following description, with reference to the attached drawings on which:

Figure 1:
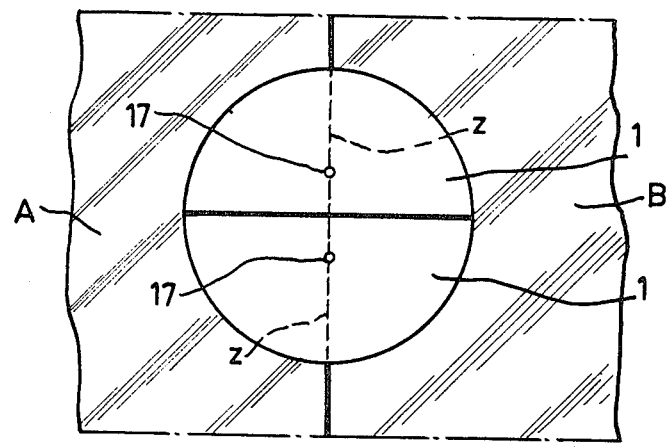
FIG. 1 is a front view of a device according to the invention in its hinged position.
Figure 2:
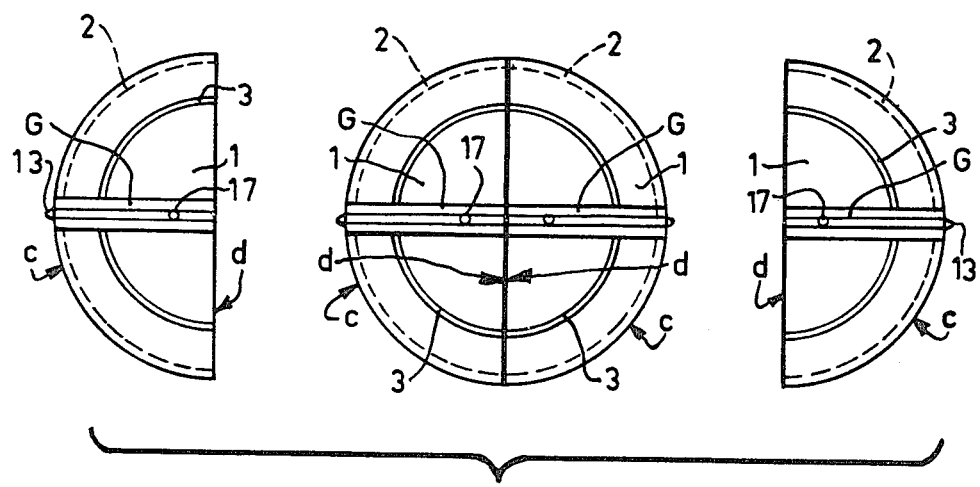
FIG. 2 is a view from the back of two semi-circular flaps as seen separately or placed side by side along their diameter.
Figure 3:
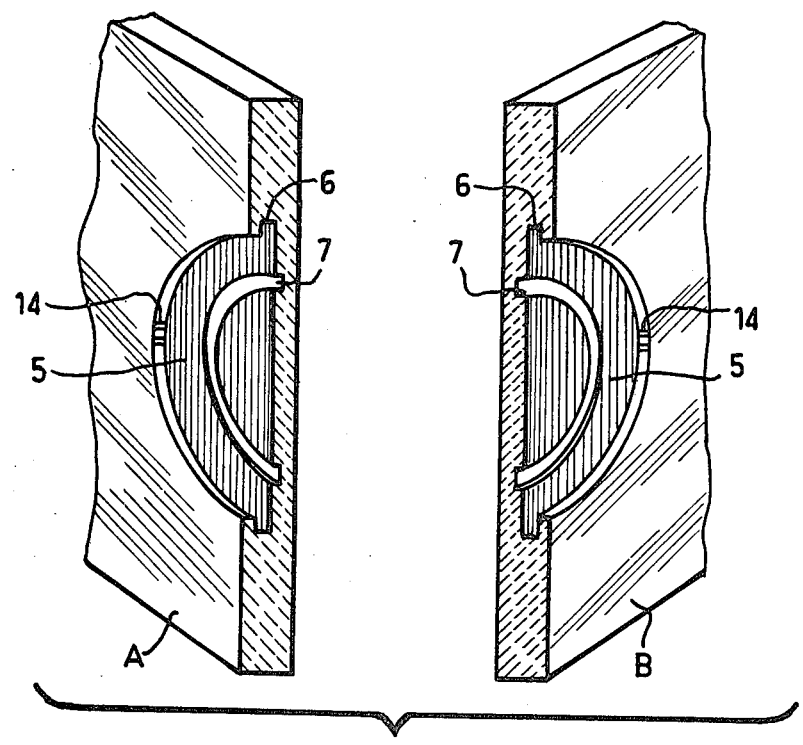
FIG. 3 is a perspective view of two parts to be hinged according to the invention, with the flaps not being fitted into position.

In the form of embodiment shown on FIGS. 1 through 7 the rotary device according to the invention comprises two identical semi-circular flaps 1. Each flap is limited by a semi-circumference c and a diameter d. A bead 2 is provided on the semi-circumference and another bead 3, in the form of a circular arc, laterally projects at a right angle from the back 4 of the flap. When both flaps are united by the diameter both beads 2 as well as both beads 3 are joined to one another.

Each flap comprises a groove portion (G), of a trapezoidal profile, comprising a narrower zone (z) to provide the hinge proper.

Figure 4:
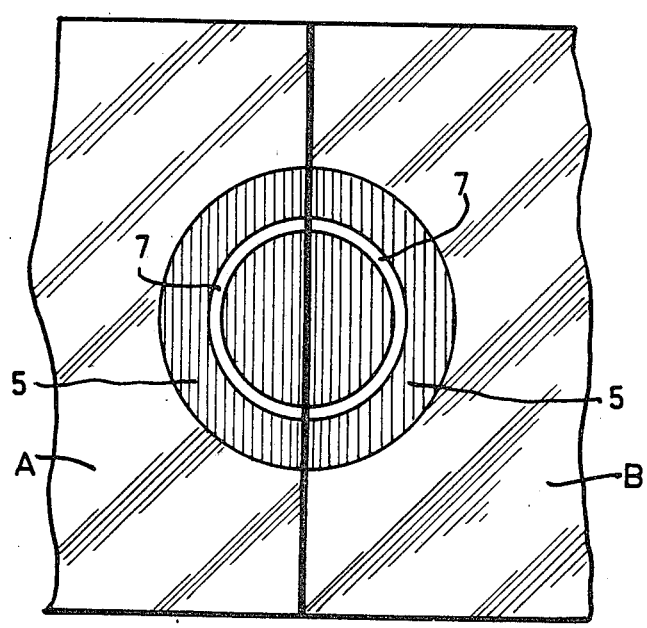
FIG. 4 is a front view of the two parts as they are brought into engagement with one another.
Figure 5:
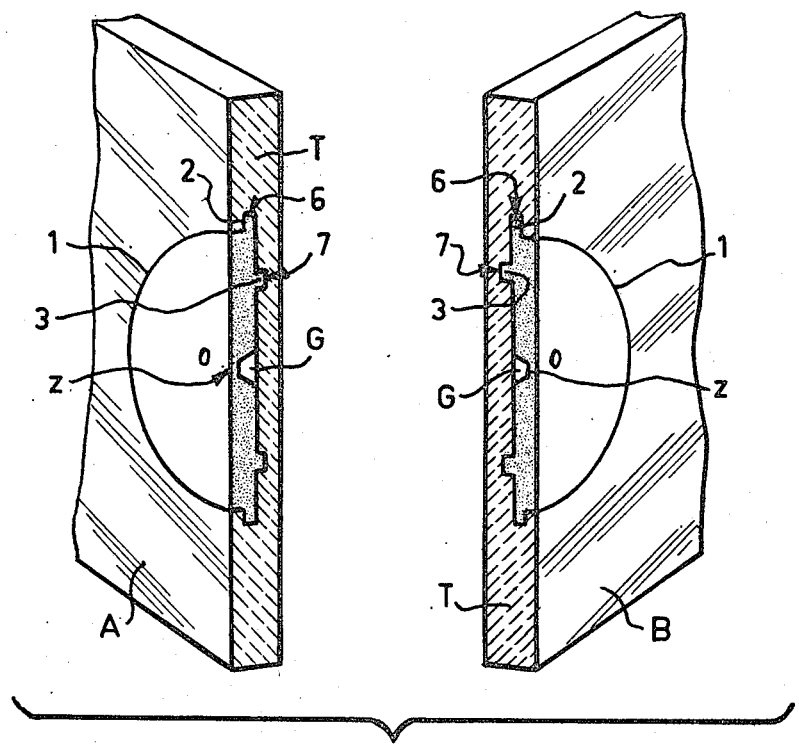
FIG. 5 is a view similar to FIG. 3 with the flaps being fitted into position.
Figure 6:
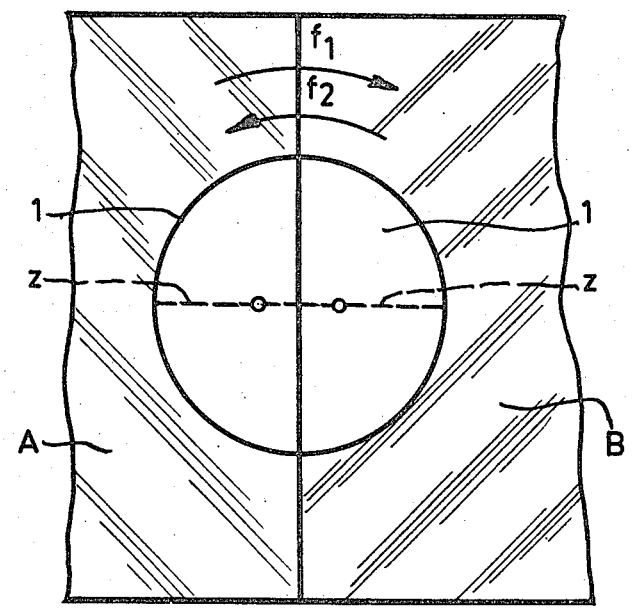
FIG. 6 is a view similar to FIG. 4 with both flaps being places side by side along their diameter.

A semi-circular housing 5 is formed in each of the parts A and B which come into contact to be hinged. Each lodging of a shape corresponding to each of the flaps has a groove 6 for housing a flap bead 2 and a groove 7 for housing a flap bead 3. When the housings 5 are placed side by side, in view of the engagement of parts A and B, both grooves 6 are joined in the same way as the two grooves 7 (FIG. 4).

A semi-circular flap 1 is inserted into each of the semi-circular housings 5. The insertion takes place by presenting laterally the flap to the housing with one diameter against the other, and rotating the flap toward the inside of the housing so that bead 2 enters groove 6 and bead 3 groove 7. Each flap is thus captive in a housing while keeping a certain degree of liberty (arrows $f_1$, $f_2$, FIG. 6).

When parts A and B are in contact with one another, the diameter d of the flaps is aligned with the end face T of parts A and B which are neither locked nor hinged (FIG. 6) but, as soon as the flaps are rotated either in the direction of the arrow $f_1$ or in the direction of arrow $f_2$, parts A and B become locked and at the end of a 90° rotation (with the portions of groove G being perpendicular to the diameter d) said parts are effectively hinged, the portions of groove G and the narrowed zones z being also aligned with edge face T of parts A and B (the diameter d of the flaps being then perpendicular to the edge face T).

In this position of the flaps, a lug 13 can be provided on the periphery of bead 2 of each flap; it can engaged into a double abutment 14 formed in the bottom of each groove 6 thereby to clamp the flap somehow.

Figure 7:
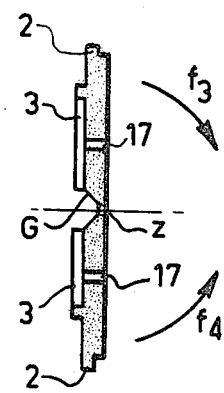
FIG. 7 is a view in profile of a flap.

The effective hinge motions are obviously produced in the direction of arrows $f_3$ and $f_4$ on FIG. 7, about the narrow zones z acting as pivots.

Figure 8:
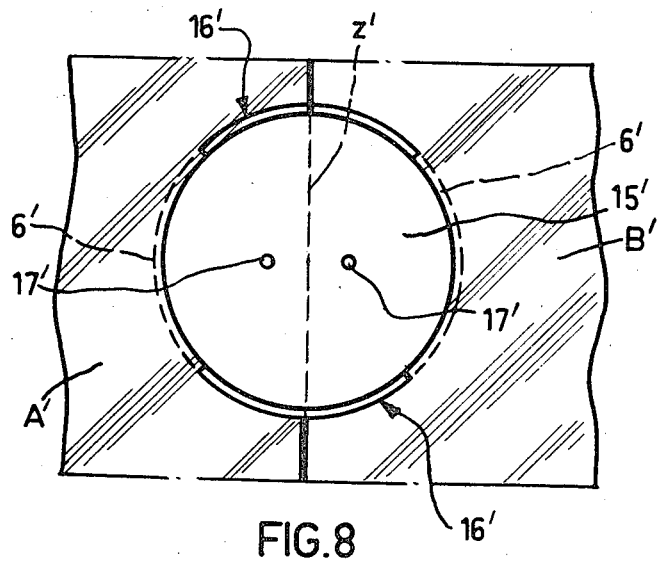
FIG. 8 is a front view of another form of embodiment of a device according to this invention in its hinged position.
Figure 9:
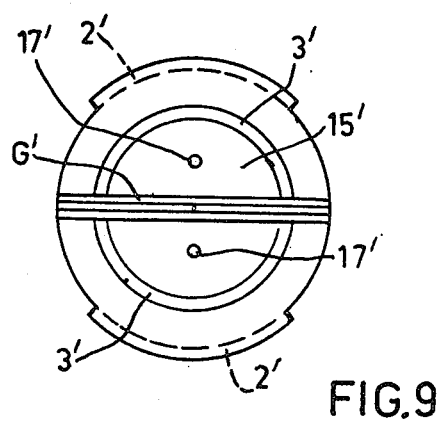
FIG. 9 is a view from the back of the single piece comprising the hinge of this form of embodiment.

In the form of embodiment shown on FIGS. 8 and 9, both semi-circular flaps are replaced by a one-piece single disc 15' formed along a diameter with a groove G' and a narrow zone z' acting as the hinge proper. The disc also comprises the two beads 3', but only two portions of bead 2', along two opposite circular arcs. Said two portions of bead 2' are to be passed, as by bayonet joint fitting through slots 16' formed in parts A' and B', and then slide in corresponding grooves 6' in said parts.

In both forms of embodiment, two holes 17 or 17' can be provided to cause rotation, either of both semi-circular flaps 1 or 1', or of the single piece 15 or 15'. Any other device suitable for causing rotation could be used, for instance, a slot common to both flaps or a simple slot for the single piece.

Obviously, this invention was only described and represented in a preferential form of embodiment and equivalent parts can be used for its constitutive elements without going beyond the scope of said invention which is defined in the attached claims.

I claim:

1. A lock rotary device for two parts to be locked together, having two semi-circular bolts not attached one to the other, each bolt carrying a bead on the edge of the semi-circle and a laterally projecting bead, characterized in that it can realize a supplementary function consisting in hinging said two parts, after said parts have preliminarily been locked, each of said bolts becoming then a semi-circular flap carrying a hinge portion disposed in such a way that when the diameters of said flaps lie side by side, the hinge portions of the flaps are aligned with one another and do not lie along either of the said diameters, said parts being effectively hinged when said hinge portions being aligned are moreover in the alignment of the end faces of said parts.

2. A device according to claim 1 wherein said aligned hinge portions are orthogonal with respect to the flap diameters lying side by side.

* * * * *